June 20, 1972 A. D. NICKOLA Re. 27,400

MOUNTING PEDESTAL FOR UTILITIES

Original Filed Nov. 20, 1967 2 Sheets-Sheet 1

INVENTOR
ANNE D. NICKOLA
BY Ross W. Campbell
ATTORNEY

MOUNTING PEDESTAL FOR UTILITIES

Original Filed Nov. 20, 1967 2 Sheets-Sheet 2

INVENTOR
ANNE D. NICKOLA

BY Paul A. Campbell

ATTORNEY

United States Patent Office

Re. 27,400
Reissued June 20, 1972

27,400

MOUNTING PEDESTAL FOR UTILITIES

Anne D. Nickola, Diane Trailer Park, 6-6255 N. Saginaw Road, Mount Morris, Mich. 48458

Original No. 3,502,785, dated Mar. 24, 1970, Ser. No. 684,199, Nov. 20, 1967. Application for reissue Dec. 3, 1970, Ser. No. 95,002
Int. Cl. H02g *9/00*
U.S. Cl. 317—99 23 Claims

Matter enclosed in heavy brackets [ ] appears in the original patent but forms no part of this reissue specification; matter printed in italics indicates the additions made by reissue.

ABSTRACT OF THE DISCLOSURE

A mounting pedestal adapted to support an electrical power box, an electric meter, a telephone box, a television jack, and a gas meter operatively in a compact arrangement for providing utility services to a mobile home. A hollow, rectangular metal post is supported in an upright position in the ground, extending thereabove, and supports an L-shaped mounting bracket on the top thereof. The bracket provides the means for supporting the power box and the meter with the telephone box, television jack and gas meter carried by the post at positions below the bracket. A ground wire is disposed within the post to connect the box, the bracket and meter to an underground grounding means.

BACKGROUND OF THE INVENTION

Field of the invention

The present invention relates to mounting pedestals for utilities, and more particularly to a mounting pedestal adapted for mounting in a safe, compact, unique and novel relationship an electrical power box, an electric meter, a telephone box, a telephone jack, and gas meter for conveniently furnishing such utilities to a mobile home.

Description of the prior art

Heretofore, electrical power, telephone service, and gas have been provided for mobile homes through separate lines and conduits leading from meters and junction boxes supported in the vicinity of the mobile home but at separate locations selected by each utility company. In trailer parks, if there were no conveniently located tree or utility pole in proximity to the mobile home, it was necessary for each utility company to drive a post into the ground to support the meter or junction box for servicing one or more nearby mobile homes. This resulted in a tangled web of electrical wires, telephone wires, and gas lines. Further, when a mobile home is removed from its parking site, each of the utilities must be disconnected and, if the meters or junction boxes were mounted upon the mobile home itself, they had to be physically removed therefrom at considerable cost of labor.

Each utility company hesitated to mount its equipment upon a post or pole provided by another utility company. If a single mounting pedestal were provided by the owner of the trailer court, it was necessary to secure clearance from the telephone company, the gas company, and the electrical power company, from the state trailer park licensing authority, and from the appropriate licensing authority of the municipality or township within which the trailer park was located, before two or more utilities could install their equipment in such close proximity to each other, for reasons of safety.

SUMMARY

It is accordingly an object of the present invention to provide an improved mounting pedestal for utilities adapted to operatively support in a safe, convenient relationship, electrical power, telephone, television, and gas service equipment for a mobile home in a manner which permits convenient connection and disconnection of such services to the mobile home. A further object of the invention is to provide a mounting pedestal for utilities which is inexpensive, easily constructed, and which meets the safety requirements of all major utility companies and conventional building and safety codes.

DESCRIPTION OF THE PREFERRED EMBODIMENT

Referring now more particularly to the drawings, in which like characters are employed to designate like parts throughout the same, I provide an elongated, hollow, metal post 10, preferably having a cross-section three inches by three inches, and painted with a rust proof paint or otherwise protected against rusting. Post 10 is of sufficient length to be supported upright when buried or driven into the ground, and to extend upwardly above the ground a sufficient distance to conveniently support utility meters and junction boxes thereon as more particularly hereinafter described. In practice, I have found it convenient to make post 10 eight feet, more or less, in length, to have it extend approximately four feet six inches into the ground, and to extend approximately forty-two inches above the surface of the ground.

Figure 1:
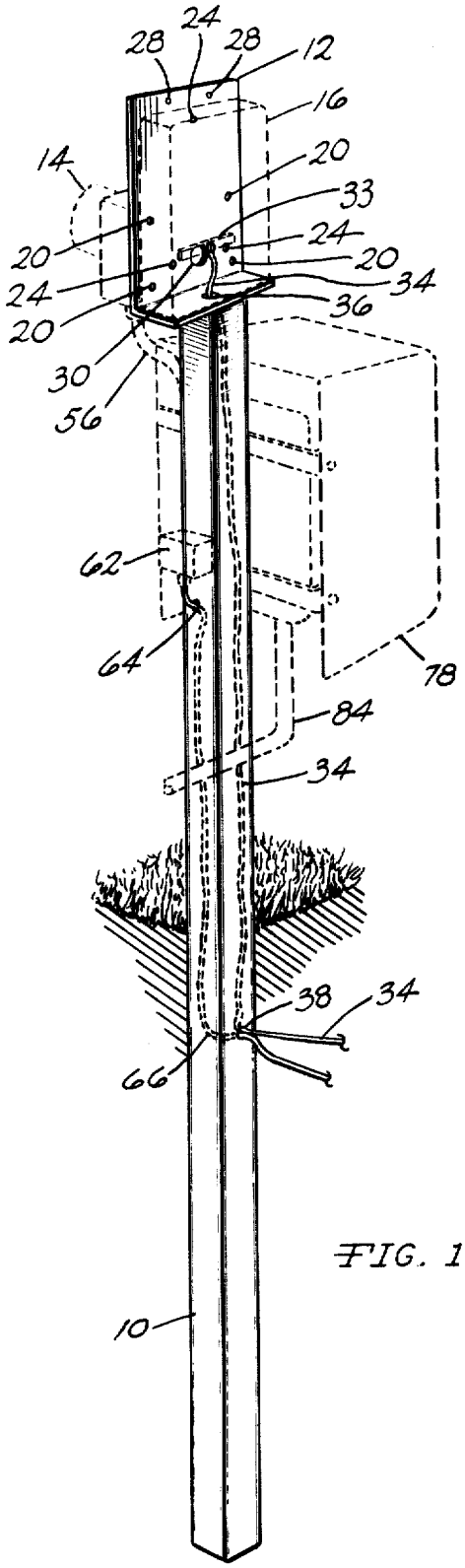
FIGURE 1 is a perspective view of my improved mounting pedestal for utilities, showing in dotted lines the electrical power box, electrical meter, telephone box, gas meter, and electrical ground wire supported thereby.
Figure 5:
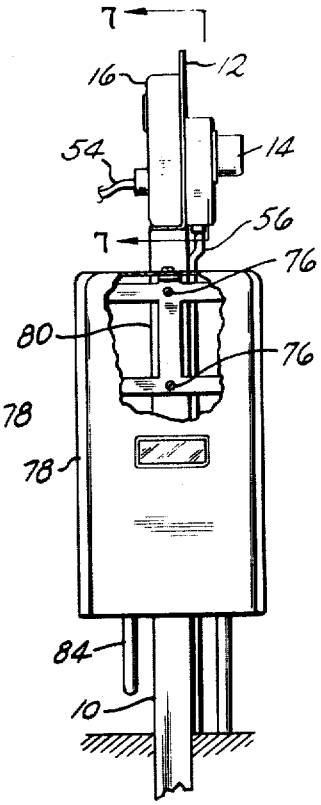
FIGURE 5 is a right elevation view of my invention.
Figure 6:
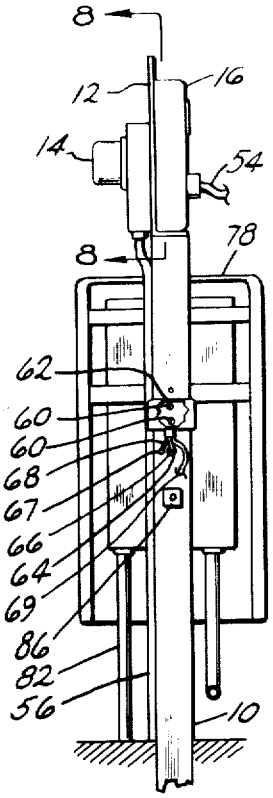
FIGURE 6 is a left elevation view of my invention.
Figure 7:
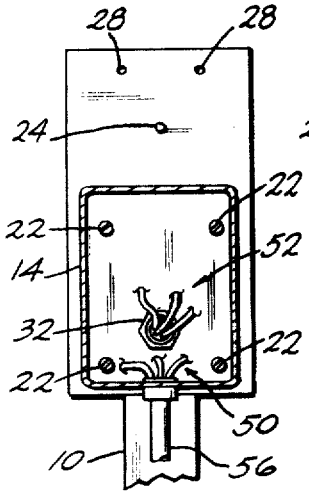
FIGURE 7 is a sectional view of an electrical meter taken along line 7—7 of FIGURE 5.
Figure 8:
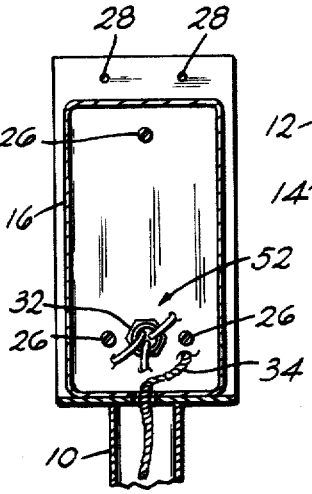
FIGURE 8 is a sectional view of an electrical power outlet taken along line 8—8 of FIGURE 6.
Figure 9:
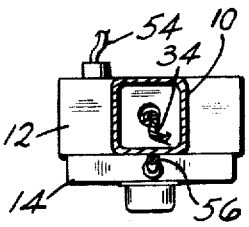
FIGURE 9 is a sectional view of a utility mounting pedestal, electrical box, and electrical meter taken along line 9—9 of FIGURE 4.
Figure 10:
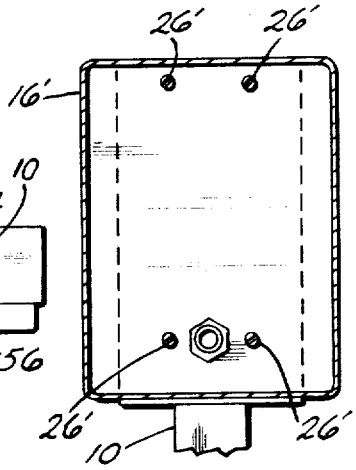
FIGURE 10 is a view similar to FIGURE 8 but showing a one hundred ampere electrical power outlet in use with my invention in place of a fifty ampere outlet.

An L-shaped mounting bracket 12 is welded or otherwise secured atop post 10, as best shown in FIGURES 1, 5, and 6. As best shown in FIGURES 1, 7, 8 and 10, the upright portion of bracket 12 is drilled with nine holes, each adapted to receive a machine screw and positioned to correspond with the standard mounting screw bolt apertures provided in the rear surface of a conventional electric power meter 14 and either a conventional fifty ampere electrical power box 16 or a conventional one hundred ampere electrical box 16'. In Michigan, the conventional electrical meter utilized by the electric utility companies requires the use of four apertures 20, 20, 20, 20, to receive machine screws 22, 22, 22, 22. The conventional fifty ampere electrical box 16 available for use in this same area requires three apertures 24, 24, 24 to receive machine screws 26, 26, 26 extending through corresponding apertures in the box. A pair of additional apertures 28, 28 are also provided in bracket 12 to receive the upper pair of machine screws 26', 26' of a conventional one hundred ampere electrical power box 16' when such a larger box is used instead of a fifty ampere electrical power box 16.

A larger aperture 30 is also drilled in the upright portion of bracket 12 in a position of mutual alignment with the conventional knock-out apertures (not shown) conventionally provided at the rear of meter 14 and power box 16 or 16'. When the meter and either power box are supported upon bracket 12 as hereinabove described, and with the knock-out apertures of the meter and box removed, a conventional threaded raceway 32 is secured through the knock-out apertures and aperture 30 of bracket 12, and secured in the usual manner, thus providing a passage for electrical wires between meter 14 and power box 16 or 16', and further securing the meter and power box together and to bracket 12.

Figure 2:
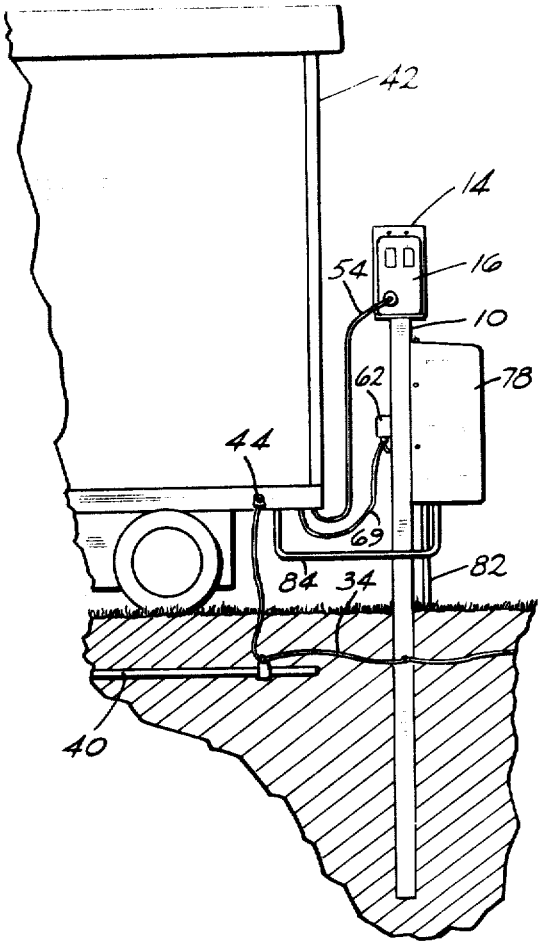
FIGURE 2 is a front view, partially in section, of a portion of a mobile home and surrounding ground area, showing the general manner in which utility equipment and connections are supported and provided by my invention.
Figure 3:
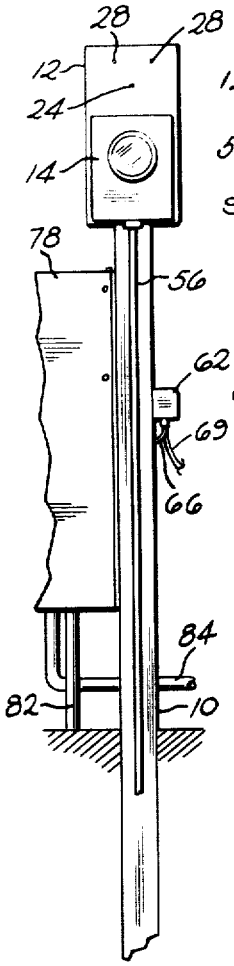
FIGURE 3 is a rear elevation view of my invention.
Figure 4:
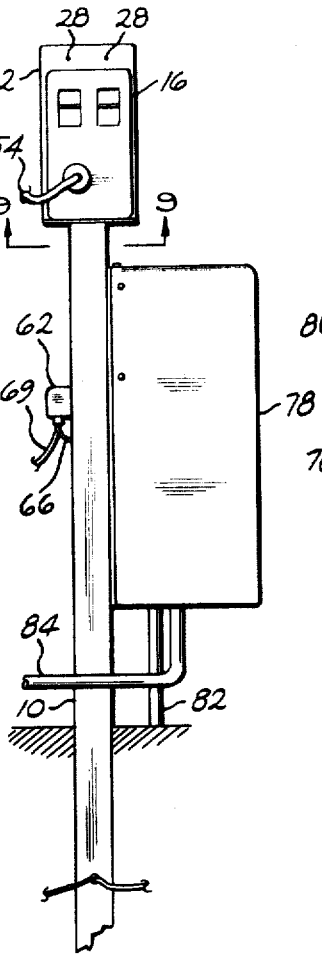
FIGURE 4 is a front elevation view of my invention.

The conventional ground terminal 33 provided in power boxes 16 and 16' is grounded by a ground wire 34 which extends downwardly through an aperture 36 in the bottom portion of bracket 12, and through the interior of hollow post 10, and emerges through an aperture 38 drilled in a wall of the post at a point which lies underground when the post is in use. As best shown in FIGURE 2, ground wire 34 is connected, in turn, to one of the conventional underground metal water pipe 40 provided for the mobile home 42 to which the utility services are provided, and to the conventional ground wire connection 44 of the mobile home itself. This combination insures a positive grounding of the mobile home appliance, the post, the power box, power meter, telephone box and gas mounted upon, and themselves grounded to the post.

Electrical power is supplied to meter 14 through three-conventional electrical wires generally indicated at 50. After metering, the electric current passes by electrical wires generally indicated at 52 through raceway 32 into power box 16. A flexible, weatherproof electrical cord 54 then conducts the electrical current from power box 16 to the conventional electrical power inlet (not shown) of mobile home 42. Electrical wires 50 are preferably shielded by an electrical conduit 56 extending from the bottom of meter 14 downwardly along post 10 to a point below ground, and extending thence to a transformer or other conventional electrical power distribution point maintained by the electrical power company.

As best shown in FIGURE 6, the left side of post 10 is provided with a pair of apertures adapted to receive self-threading screws or toggle bolts 60, 60 for supporting thereon a conventional telephone service box 62. An additional aperture 64 is provided in post 10 immediately below box 62 to receive conventional telephone service wires 66 and permitting same to extend downwardly within the post to aperture 38 from which they emerge and extend underground to a convenient location for connection to the main telephone service line. A smaller aperture (not shown) is drilled into post 10 adjacent to aperture 64 and tapped to receive a machine screw 67 by which the conventional ground wire 68 for box 62 may be fastened to the post. The lead-in wires for conveying telephone service from box 62 to mobile home 42 are contained in a conventional flexible, weatherproof cable 69 and are connected to the conventional telephone inlet (not shown) of mobile home 42 in the usual manner.

An additional pair of apertures are provided in the right side of post 10 to receive self-threading screws or toggle bolts 76, 76 for securing a conventional gas meter box 78 to the post as best shown in FIGURE 5. Bracing means generally indicated at 80 in FIGURE 5 is conventionally provided within the gas meter box 78 to facilitate mounting same. A gas inlet pipe 82 extends from meter 78 downwardly into the ground, and from thence to the conventional distribution lines of the gas company, to supply gas under pressure to the meter. Metered gas is, in turn, conducted from meter 78 by a gas pipe 84 to the conventional gas inlet (not shown) of mobile home 42.

As an optional feature, a conventional television antenna connection 86 may be mounted upon post 10, preferably below telephone box 62 as shown in FIGURE 6, and a television antenna cable extend through an aperture (not shown) in the post, downwardly through the interior of the post, and outwardly through aperture 38 (or a separate aperture, if preferred), underground to the common television antenna of a central antenna system providing service for several mobile homes.

It will be particularly noted that the spatial arrangements of meter 14, power box 16, mounting bracket 12, aperture 30 and 36, ground wire 34, and aperture 38, all cooperate to provide a structurally strong, easily assembled, and perfectly grounded assembly for the purpose intended. Gas meter 78 and telephone box 62, being mounted on opposite side of post 10, are physically separated and yet permanently grounded by common post 10 to which they are both fastened. The service lines and pipes for all three utilities extend underground from post 10 or immediately adjacent thereto to the conventional distribution lines or pipes of the utility companies, thus being protected againts damage by moving vehicles and mobile homes being moved into and out of the trailer park. Lines 54, 68, and 84, which conduct utility services from the mounting pedestal to mobile home 42 and ground wire 34, may be easily disconnected at their respective conventional points of connection to the mobile home when it is desired to remove the mobile home from the site.

My invention has received approval of Michigan Bell Telephone Company, Consumers Power Company, Michigan Consolidated Gas Company, the Michigan Mobile Home Association, the National Mobile Home Association, the Mobile Homes Manufactures Association Park Division, and the Michigan State Electrical Adminstration. It is accordingly adapted for use in compliance with the strictest building and safety codes, and hence provides assurance to all utility companies, licensing authorities, trailer park operators and mobile home owners of maximum safety, convenience, ease of installation, and rapid and convenient connection and disconnection of utility services to a mobile home.

What is claimed is:

1. An elongated hollow post closed at one end and adapted to be partially embedded in the ground in the upright position with said closed end disposed above ground, an L-shaped bracket carried by said post having a base portion extending across said upper end of said post and an upstanding portion for mounting an electrical meter and a power box on opposite sides of said upstanding portion, and a ground wire carried within said post and having one end extending through said base portion for connection with said meter and said power box and an opposite end adapted for connection to a grounding means, said opposite end extending from said post at a point along the length thereof which would be below ground when the post is embedded in the ground.

2. The post as defined in claim 1, including means carried by said post for mounting a telephone box and a gas meter to said post.

3. The post as defined in claim 1, and including means longitudinally spaced from said bracket for mounting a television jack on one side of said post.

*4. An elongated post mounted in an upright position, an electrical meter and an electrical power box mounted on the upper end of said post on opposite sides thereof, a heating fuel metering means mounted to said post below said electrical meter and said electrical power box.*

*5. The post as defined in claim 4 and including a ground wire having one end mounted to said power box and extending along said post with the other end mounted to a grounding means.*

*6. The post as defined in claim 5 and including a telephone box mounted to said post.*

*7. A hollow post mounted in an upright position, a bracket supported at the top of said post, said bracket having an upright portion, an electrical meter and an electrical power box mounted on opposite sides of the upright portion of said bracket, and a common ground wire electrically connecting said electrical meter and power box to a grounding means.*

*8. The post as defined in claim 7 and including a gas meter mounted to said post below said bracket.*

*9. The post as defined in claim 7 and including a telephone box and a television jack mounted to said post.*

*10. A hollow metal post mounted in the ground in an upright position, a bracket having an upright portion and a horizontal portion, said bracket supported atop said post and having a first aperture in in said upright portion and a second aperture in said horizontal portion, said second aperture being in registry with the interior of said post, an electrical meter and an electrical power box mounted on opposite sides of said bracket, electrical wires connecting said electrical power box and said electrical meter through said first aperture, a common ground wire electrically connected to said electrical power box and said electrical meter and extending through said second aperture into the interior of said post to emerge therefrom beneath the ground to be connected to a grounding means.*

*11. The post as defined in claim 10 and including a heating fuel metering means mounted to said post below said bracket.*

*12. The post as defined in claim 10 including a telephone service box mounted to said post and telephone service wires carried within said post and connected to said telephone service box.*

*13. The post as defined in claim 10 and including a television antenna connection mounted on said post and a television antenna cable connected to said television antenna connection and extending into the interior of said post.*

*14. An elongated hollow post mounted in an upright position with one end below ground, an electrical meter and an electrical power box mounted at the upper end of said post in back-to-back relationship, electrical wires extending upwardly through the interior of said post from a point below ground and electrically connected to said meter, an electrical wire connected to and extending from said power box, a ground wire extending along said post with one end connected to said power box and an opposite end extending through the ground through a grounding means, and a gas meter mounted to said post.*

*15. An elongated hollow post mounted in an upright position with one end below ground, an electrical meter and an electrical power box mounted at the upper end of said post in back-to-back relationship, electrical wires extending upwardly through the interior of said post from a point below ground and electrically connected to said meter, an electrical wire connected to and extending from said power box, and a gas meter mounted to said post.*

*16. An elongated hollow post mounted in an upright position with one end below ground, an electrical meter and an electrical power box mounted at the upper end of said post in back-to-back relationship, electrical wires extending upwardly through the interior of said post from a point below ground and electrically connected to said meter, an electrical wire connected to and extending from said power box, and a telephone box mounted to said post.*

*17. An elongated hollow post mounted in an upright position with one end below ground, an electrical meter and an electrical power box mounted at the upper end of said post in back-to-back relationship, electrical wires extending upwardly through the interior of said post from a point below ground and electrically connected to said meter, an electrical wire connected to and extending from said power box, and a television jack mounted to said post.*

*18. An elongated hollow post adapted to be partially embedded in the ground at an upright position;*

*a bracket supported at the top of said post and an electrical meter and an electrical power box supported on said bracket, an electrical power wire and a ground wire in said meter and said box having means thereon for securing said electrical power wire and said ground wire thereto;*

*said post having an aperture formed therein which would be below ground when the post is embedded in the ground for receiving one of said wires thereto and a passageway formed therein substantially parallel to the axis of elongation of said post and communicating with said aperture for communicating a wire from said aperture to said meter and box, said post including a wall extending substantially parallel to the axis of elongation of said post for separating said power wire from said ground wire when said wires are connected to said meter and box;*

*and including a gas meter secured to said post.*

*19. The post as defined in claim 18 including mounting means carried by said post for securing a telephone box thereto.*

*20. The post as defined in claim 18 including means carried by said post for mounting a television jack thereto.*

21. An elongated post mounted in an upright position, an electrical meter and an electrical power box mounted to said post, electrical wires extending upwardly along said post and electrically connected to said meter, an electrical wire connected to and extending from said power box, and a heating fuel metering means mounted to said post.

22. The post as defined in claim 21 and including a ground wire having one end mounted to said power box and extending along said post with the other end mounted to a grounding means.

23. The post as defined in claim 21 and including a telephone box mounted to said post.

References Cited

The following references, cited by the Examiner, are of record in the patented file of this patent or the original patent.

UNITED STATES PATENTS

| | | | |
|---|---|---|---|
| D. 204,269 | 4/1966 | Naudus, Jr. | 174—38 UX |
| 438,773 | 10/1890 | Dinn | 174—45 R |
| 1,481,280 | 1/1924 | Bivens | 174—38 UX |
| 1,972,187 | 9/1934 | Farnam | 174—38 UX |
| 2,982,593 | 5/1961 | Chambers | 312—223 |
| 3,167,609 | 1/1965 | Brann | 174—45 R X |
| 3,341,268 | 9/1967 | Bickford | 174—38 UX |
| 3,450,951 | 6/1969 | Boyle | 317—105 |
| 3,015,024 | 12/1961 | Clarchan. | |
| 3,180,920 | 4/1965 | Fletcher et al. | 174—38 |
| 3,215,831 | 11/1965 | Gladsden et al. | |
| 3,238,289 | 3/1966 | Rowe. | |
| 3,257,496 | 6/1966 | Hamilton | 174—45 X |
| 3,341,744 | 9/1967 | Barwick. | |
| 3,661,938 | 1/1968 | Watson | 317—99 X |

FOREIGN PATENTS

| | | | |
|---|---|---|---|
| 1,169,544 | 5/1964 | Germany | 174—60 |

LARAMIE E. ASKIN, Primary Examiner

U.S. Cl. X.R.

174—38, 45 R

UNITED STATES PATENT OFFICE

CERTIFICATE OF CORRECTION

Patent No. Re. 27,400 Dated June 20, 1972

Inventor(s) Anne D. Nickola

It is certified that error appears in the above-identified patent and that said Letters Patent are hereby corrected as shown below:

Column 5, Claim 14, line 49, delete "through the interior of" and insert --along--.

Column 5, Claim 15, line 60, delete "through the interior of" and insert --along--.

Column 5, Claim 16, line 68, delete "through the interior of" and insert --along--.

Column 6, claim 17, line 3, delete "through the interior of" and insert -- along --.

Signed and sealed this 20th day of March 1973.

(SEAL)
Attest:

EDWARD M.FLETCHER,JR.
Attesting Officer

ROBERT GOTTSCHALK
Commissioner of Patents